E. MEITNER.
RANGE INDICATOR.
APPLICATION FILED NOV. 15, 1915.
1,373,442.
Patented Apr. 5, 1921.
3 SHEETS—SHEET 1.
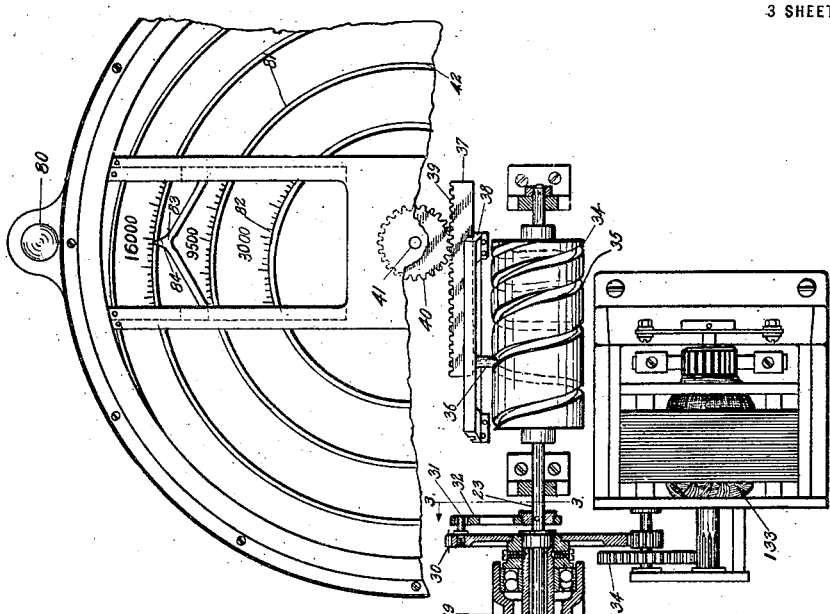
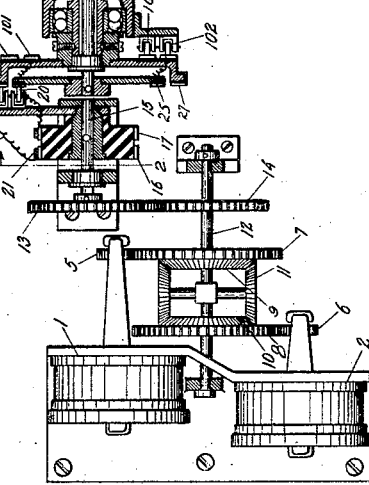
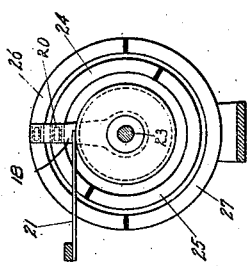
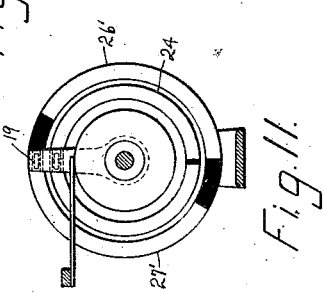
WITNESSES:
Aug. Schraegle
Geo. A. Swartz
INVENTOR
ELEMER MEITNER
BY
Herbert H. Thompson
ATTORNEY

E. MEITNER.
RANGE INDICATOR.
APPLICATION FILED NOV. 15, 1915.

1,373,442.

Patented Apr. 5, 1921.
3 SHEETS—SHEET 3.

INVENTOR.
BY ELMER MEITNER
Herbert H. Thompson
ATTORNEY.

UNITED STATES PATENT OFFICE.

ELEMER MEITNER, OF BROOKLYN, NEW YORK, ASSIGNOR TO THE SPERRY GYROSCOPE COMPANY, OF BROOKLYN, NEW YORK, A CORPORATION OF NEW YORK.

RANGE-INDICATOR.

1,373,442.  Specification of Letters Patent.  Patented Apr. 5, 1921.

Application filed November 15, 1915. Serial No. 61,480.

*To all whom it may concern:*

Be it known that I, Dr. ELEMER MEITNER, a subject of the King of Hungary, residing at Brooklyn borough, New York city, have invented certain new and useful Improvements in Range-Indicators, of which the following is a specification.

This invention relates to an apparatus for visually indicating the range either adjacent the range finder or at a distance therefrom. As is well known, the range is a variable function of the angles made by the sighting telescopes, so that if a range scale is laid out which is designed to be moved with the turning of the telescopes, it must necessarily be an uneven scale, portions of the graduations being too small to be read accurately, while other portions are coarser than necessary. It is also apparent that it would be impossible to employ an ordinary revolution counter as an indicator with such variable motion.

It is one of the objects of the present invention to provide means for converting this variable motion into a constant motion whereby an even scale or counters may be employed to indicate the range. Another object of the invention is to eliminate the objectionable hunting or oscillation of range indicators which takes place when the operator is hunting for the target. In practice, it is found that the indicator will cross and recross the true range reading several times before coming to rest thereon, so that the observer is confused and misled as to the range. A third object is to improve upon the electrical sending and receiving devices used for transmitting the range. Other objects will appear as the description proceeds.

Referring to the drawings in which what I now consider the preferred forms of my invention are shown:

Figure 1 is a plan view partly in section of an indicating instrument embodying my invention.

Fig. 2 is a detail thereof being a section on line 2—2 of Fig. 1.

Fig. 3 is a section on line 3—3 of Fig. 1.

Figs. 10 and 11 are details of a modification.

Figure 6:
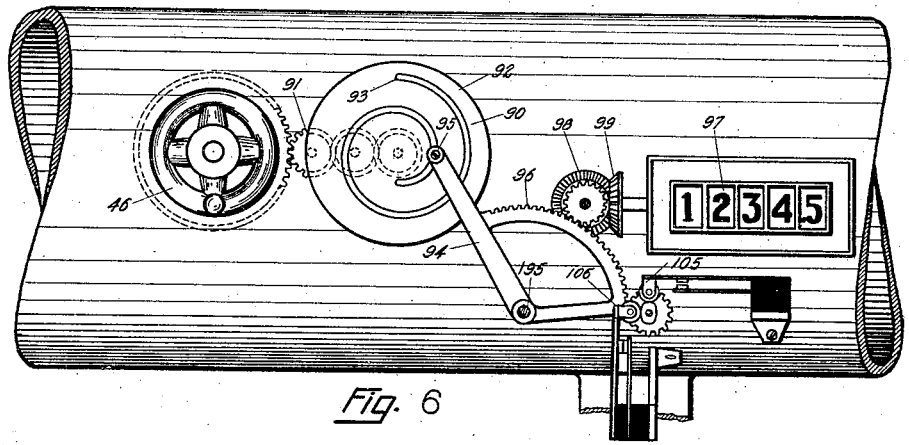
Fig. 6 is an elevation of a range finder showing a modified form of indicator attached thereto.

No attempt has been made in Fig. 1 to show the indicator exactly as constructed, but the mechanism has been developed or laid out in plan so that the invention may be clearly illustrated in one view.

I prefer to employ a plurality of repeater motors 1 and 2 which are driven from a plurality of transmitters 3 and 4 on the range finder which are hereinafter referred to.

The repeater motors are provided with pinions 5 and 6 which mesh with large gears 7 and 8. Said gears serve to rotate the opposite arms 9 and 10 of a differential or epicyclic train of gearing, which in this instance is shown as a bevel train. The middle arm 11 of said train is secured to a central shaft 12, which drives a gear 13 through gear 14.

I prefer to employ a follow-up motor interposed between the repeating motors and the indicator, upon which motor all the work of rotating the indicator and its connected mechanism is thrown. Mounted on the shaft 15 of gear 13 are a pair of slip rings 16 and 17, and an arm 18, which carries one portion of a plurality of contacts which are shown in the form of trolleys 19 and 20. Brushes 21 bear on said rings and serve to carry current to the trolleys through wires 22 connecting the rings and trolleys. Secured to shaft 23 which is preferably placed in line of the shaft 15, are a plurality of reversing contacts 24 and 25 adapted to coöperate with trolley 20. A second pair of reversing contacts 26 and 27 are mounted upon a member 28 secured to a sleeve 29, which is loosely mounted upon shaft 23. A gear 30 is secured adjacent one end of sleeve 29, and is provided with a pin 31. An arm 32 is pinned or otherwise secured to shaft 23, and is provided with a slot 33 in which pin 31 is allowed limited play.

The follow-up or reversible motor 133 may be connected to gear 30 through reduction gearing 334. The current is led from both pairs of reversing contacts to the motor 133 through contact or slip rings 100, 101, and trolleys or brushes 102, 103 from which wires 104, 105 (not shown in Fig. 1.) lead to motor 133.

Figure 7:
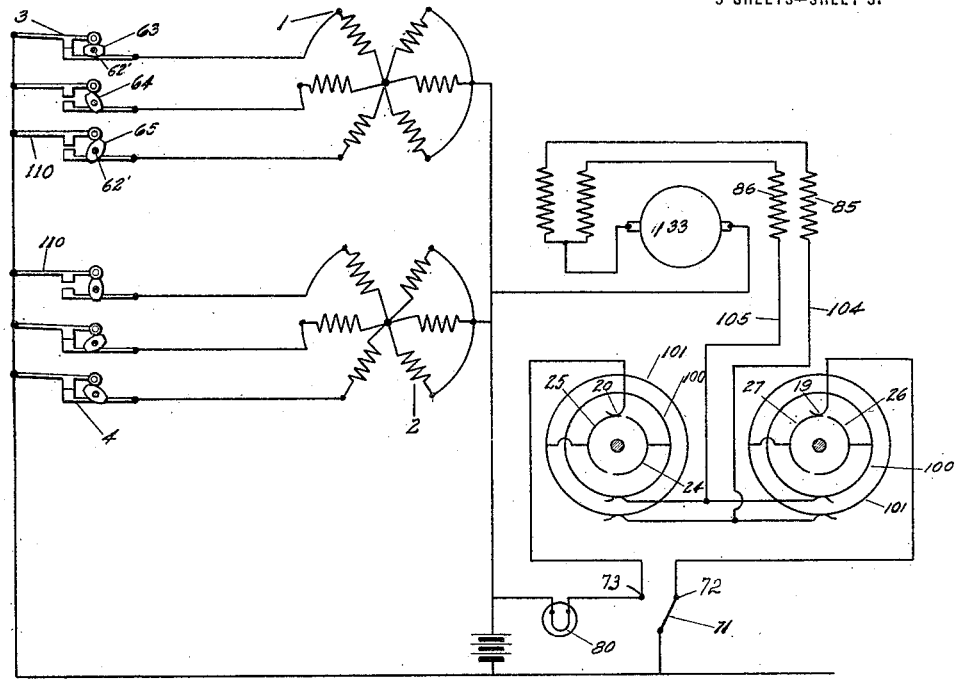
Fig. 7 is a wiring diagram of the main form of my invention.

One method by which motor 133 may be reversed is illustrated in Fig. 7. The motor is shown as provided with a pair of field windings 85, 86, each of which is in circuit with one of the reversing contacts 24, 25 or 26 and 27. If the switch 71 is on contact 72 (hereinafter described) for instance, as the trolley 19 crosses from contact 26 to 27 the field of motor 133 will be reversed, as will be readily understood from Fig. 7.

A cam-like member 34 is mounted on shaft 23, which is shown in the form of a cylinder 34 provided with a cam groove 35. A pin 36 on slide 37 engages said groove 35. Slide 37 is shown as guided in a slide way 38, and is provided with rack teeth 39 which serve to rotate pinion 40, for rotating indicator or dial 42 as through shaft 41. Groove 35 is laid out so that a uniform motion is transmitted to indicator 42 for equal changes of the range, so that while a variable rotation is imparted to the cam 34 by such changes of range as explained above, an even or uniform motion is transmitted to the indicator.

Figure 9:
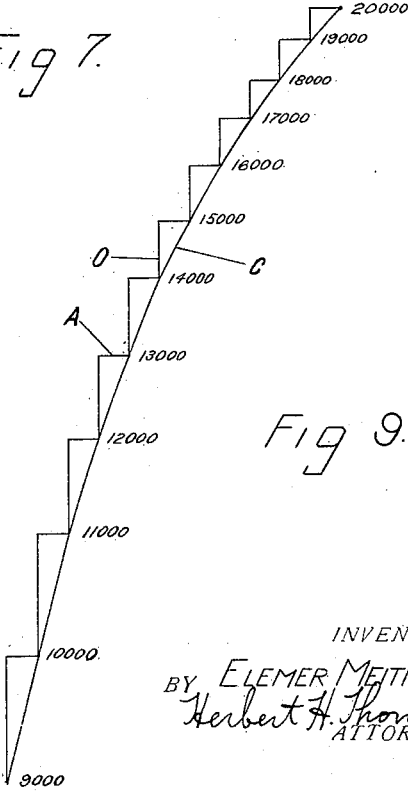
Fig. 9 is a diagram illustrating one method employed for laying out the cam grooves.

The method by which the cam grooves is laid out is shown in Fig. 9. It will be noted that the abscissæ A. are laid out so as to be equal for equal changes of the range, while the ordinates O., are variable the ranges being laid out along the curve C. These ordinates vary in length as they are proportional to a function of the observed angles and not to angles themselves. This curve wrapped around a cylinder with the abscissæ A, extending axially forms the pattern for cam groove 35.

Figure 4:
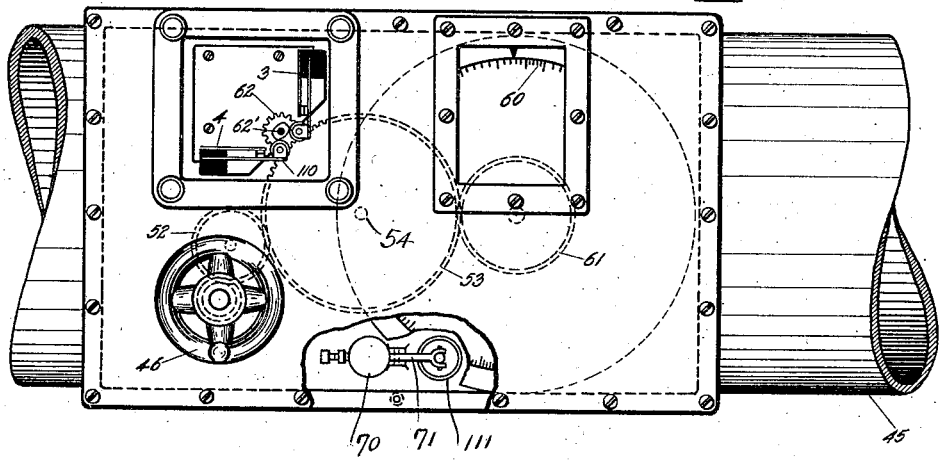
Fig. 4 is a view of a portion of a range finder showing my transmitting apparatus mounted thereon.
Figure 5:
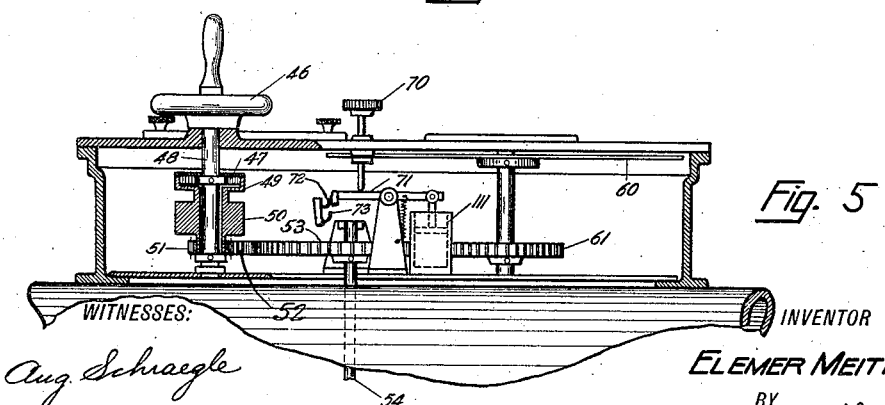
Fig. 5 is a vertical section of a portion of Fig. 4.

The sending or transmitting instrument which is connected to the receiving instrument shown in Fig. 1, is shown in Figs. 4 and 5. 45 indicates a portion of an optical range finder on the side of which is mounted handle 46 for operating the instrument and the transmitters 3 and 4 above referred to. Since a sudden jerk on handle 46 would be liable to throw the repeater motors out of step with the transmitters, I prefer to interpose between the handle and the transmitters an inertia or constant speed device. I find such a device of great importance in preventing the operator from rotating handle 46 at such a high speed that the repeater motors will get out of step with the transmitter, since as a rule, such high speed is attained only in jerks, as the average operator is unable to turn the handle at a sustained speed high enough to interfere with the operation of the device. Said speed limiting device may consist of a spring 47 secured adjacent one end to the shaft 48 of handle 46, and secured adjacent its other end to the interior of an enlarged extension 49 of a fly wheel 50. Said fly wheel is loosely mounted on shaft 48, and is provided with a pinion 51 meshing with idler 52. A gear 53 mounted upon a shaft 54 meshes with said idler and serves to rotate an indicating dial 60 through gear 61. Shaft 54 is shown as extending within instrument 45, so as to actuate the same through mechanism not shown. Transmitters 3 and 4 may be actuated by a pinion 62 meshing with gear 53. These transmitters are shown as of the cam type, and consist of a plurality of contact fingers 110, which are raised and lowered in succession by cams 63, 64, 65 on the shaft 62' of pinion 62, the action being illustrated in the wiring diagram in Fig. 7. The two transmitters are placed so that one will transmit its impulses in between the steps or impulses of the other, so that double the number of steps will be secured. That is in the type of repeater motors shown, each motor has twelve steps per revolution, the motors having one step between each pole when two of the contacts are down as shown in connection with transmitter 4, in the wiring diagram as well as a step under each pole. While the apparatus is arranged so that each motor has but 12 steps, the transmitters are positioned so that at the time when one motor is stationary the other motor is receiving a new impulse, thus securing in effect twenty-four steps per revolution.

This arrangement possesses a great advantage over a motor and transmitter with double the number of poles, since it is well known that the speed at which impulses may be transmitted is limited, so that if a great number of steps is employed per revolution the speed of transmission must be correspondingly reduced. With my system, however, the same or greater speed in transmitting may be used as with the ordinary transmission system, and at the same time a greater number of steps and hence greater accuracy is secured.

Figure 10:
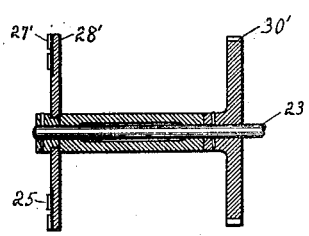

I also prefer to mount on the sending instrument 45 a button 70 which serves to operate a switch 71. In the normal position switch 71 is in contact with the upper contact 72, but on pushing the button down, contact is made with a lower contact 73. Contacts 72 and 73 are in circuit with the pairs of reversing contacts 26, 27, and 24, 25 respectively, so that the follow up motor is normally energized through contacts 26 and 27, but when button 70 is depressed a circuit is made through the other pair of contacts. The operation of this portion of my invention is as follows:

As above stated, the operator of the range finder generally moves the instrument back and forth through a small arc several times before he brings the two images of the target into coincidence. During this operation trolley 19 and contacts 26 and 27 are in the excited circuit, and under this condition a rapid oscillation of the trolley arm 18 through a small arc would not result in moving the indicator, since although the motor would be actuated thereby, the lost motion between pin 31 and arm 32, would prevent the movement of the motor being transmitted to the indicator. But when button 70 is depressed trolley 20 is placed in the main circuit and motor 133 is immediately actuated to bring the contacts 24 and 25 to the zero position, and also the indicator 42 to the exact range. Switch 71 is preferably provided with a retarding device, such as a dash pot 111, so that the switch will remain depressed, after actuation by the range officer, a sufficient time for the follow up motor to bring the indicator to the correct position. A lamp 80 is preferably placed in the last mentioned circuit, so that the observer may know when the operator of the range finder has found the true range. Instead of providing a mechanical lost motion connection between disk 28 carrying contacts 26, 27 and cam 34, such as pin 31 and slot 33, I may allow for the required lost motion by varying the characteristics of the electrical portions of the follow-up system. Thus, as shown, in Figs. 10 and 11, the insulated space between contacts 26' and 27' may be increased sufficiently to allow for this, in which case the construction may be simplified by mounting both sets of contact segments on the same disk 28 which is secured to shaft 23 directly, and omitting member 32.

I prefer to equip the indicating dial 42 with a spiral groove 81 and with a spiral scale 82, so that a greater number of indications may be placed thereon. The index or pointer 83 is provided with a pin 84 which engages said groove, so that the index is moved radially as the dial is rotated.

Figure 8:
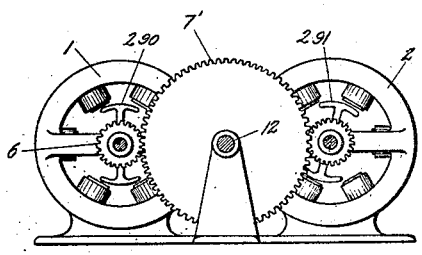
Fig. 8 is a detail showing a modified form of a portion of Fig. 1.

Fig. 8 illustrates an alternative method of connecting repeater motors 1 and 2 from that shown in Fig. 1. I have shown the two motors connected directly to a common gear 7' on shaft 12, instead of employing a differential connection. Bearing in mind that each impulse of one of the transmitting mechanisms 110 occurs at a later time than the corresponding impulse of the other mechanism, it will be obvious that the armatures 290 and 291 may be so positioned with respect to each other as to obtain 24 steps per revolution as before.

Fig. 6 illustrates several modified forms that my invention may assume within the scope of the appended claims. It is obvious that instead of employing a rotary dial 42, a revolution counter may be used, since by my invention an even or constant movement of the indicator is secured for equal changes of the range, which is especially adapted for the counter system. It is also apparent that the cam-like part through which this result is obtained, as well as the indicator proper, may be placed directly on the range finder, instead of at a distance therefrom. These modifications comprise the major portion of Fig. 6. The operating handle is shown at 46 as before, but in this instance, it is used to actuate a cam part 90 similar in function to cylinder 34, through idlers 91. Cam part 90 is shown in this form of invention as a flat plate 92, in which is cut a cam groove 93 of similar characteristics to groove 35. Motion is transmitted by said groove to an arm 94 by means of a pin 95 on said arm which engages the groove. Arm 94 is pivoted at 195 and is provided with gear sector 96, which may serve not only to rotate counter 97 through pinion 98, and bevel gears 99, but may also serve to actuate a transmitter or transmitters 105, 106. These transmitters may be used to govern at a distance an indicator similar to the one shown in Fig. 1, except of course that cam part 34 would be omitted, as transmitters 105 would transmit the required even or uniform motion for the indicator without the interposition of a further correcting device.

The operation of the foregoing parts is in brief as follows:—The range officer brings the range finder to bear on the target by rotating handle 46. While he is accomplishing this, transmitters 3 and 4 are being actuated to cause repeater motors 1 and 2 to follow their movements. During this time the follow up motor is in circuit with contact 72 and trolley 19, so that the indicator will not follow the small adjustments as explained. As soon as the range officer has the exact range, he presses button 70 which will light lamp 80 and cause the true range to be shown on indicator 42. As shown, the range finder is preferably also provided with an indicator, which is shown as of the old or uneven type in Fig. 4, but of my improved type in Fig. 6.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:—

1. In a range indicator, a transmitter, a receiver, connected to said transmitter, a cam-like part adapted to be rotated by said receiver with reference to a function of the indicated angles, a member adapted to be actuated by said part, said part being so designed as to impart a constant movement to said member for equal changes of range by the variable rotation of said part, and an indicator connected to said member.

2. In an electrical indicator system, a transmitting mechanism designed to transmit a predetermined number of impulses per cycle, a second transmitting mechanism designed to transmit impulses, means connecting said transmitting mechanisms for simultaneous actuation, each of the impulses of one of said transmitting mechanisms occurring at a later time than the corresponding impulse of the other transmitting mechanism, a plurality of repeater motors, one connected to said first transmitting mechanism and another to the second transmitting mechanism and an indicator connected to both of said repeater motors.

3. In an electrical indicator system, a sending instrument including a plurality of impulse transmitting mechanisms so connected that each impulse of one of said mechanisms occurs at a later time than the corresponding impulse of another of said mechanisms, and a receiving instrument comprising a plurality of interconnected repeating devices actuated from said transmitting mechanisms whereby the number of steps of the receiving instrument is increased without increasing the transmitter speed.

4. The combination with a range finder and a range indicator, a transmitter on the range finder, a repeater motor in said indicator in circuit with said transmitter, a power motor for operating the indicator, a two part contact, one part of which is operated by said repeater motor, the other part being operated by said power motor, and electrical connections between said contact and said power motor.

5. The combination with a range finder and a range indicator, a transmitter on the range finder, a repeater motor in said indicator in circuit with said transmitter, a power motor for operating the indicator, a two part contact, one part of which is operated by said repeater motor, the other part being operated by said power motor, and means for establishing and breaking the circuit between said power motor and said two part contact.

6. In a range indicator, a motor, a governing means for the motor, a lost motion connection between the motor and the indicator, whereby the indicator will not follow the hunting movements of range finder, and a second governing means for the motor adapted to be actuated when the target is found, for bringing the indicator to the precise range.

7. In a repeater system, the combination with a sending instrument, and a receiving instrument, of means for causing said receiver to follow the movements of the sending instrument approximately and auxiliary means responsive to the will of the operator for causing said receiver to indicate the exact position of the sending instrument.

8. In an indicator, a follow up system including a plurality of two part commutating devices, each device comprising a plurality of contact members, and a coöperating contact therefor, means for causing one part of each device to repeat predetermined movements, a follow up translating device, and means whereby said translating device may be thrown into circuit with such of said commutating devices as desired.

9. In an indicator, a follow-up system including a plurality of two part commutating devices, each device comprising a plurality of contact members, and a coöperating contact therefor, means for causing one part of each device to repeat predetermined movements, a follow up translating device, and means whereby said translating device may be thrown into circuit with such of said commutating devices as desired, said translating device having a follow-up connection with the other part of each commutating device.

10. In an indicator, a follow-up system including a plurality of two part commutating devices, each device comprising a plurality of contact members, and a coöperating contact therefor, means for causing one part of each device to repeat predetermined movements, a follow up translating device, means whereby said translating device may be thrown into circuit with such of said commutating devices as desired, a lost motion follow-up connection between said translating device and the other part of one of said commutating devices, and a more precise connection between said translating device and the other part of another of said commutating devices.

11. In a repeater system, a follow-up system including a plurality of two part commutating devices of different characteristics, each device comprising a plurality of contact members, and a coöperating contact therefor, means for causing one part of each device to repeat the same predetermined movements, a follow-up translating device, and means whereby said translating device may be thrown into circuit with such of said commutating devices as desired.

12. In a repeating system, a plurality of repeater motors, mechanical means interconnecting said motors, reversing contacts driven by said means, a reversible translating device in circuit with said contacts, and a receiver operable by said translating device.

13. In a repeating system, a plurality of repeater motors, mechanical means interconnecting said motors, reversing contacts driven by said means, a reversible translating device in circuit with said contacts, a follow-up connection between said translating device and said contacts, and a receiver operable by said translating device.

14. In a repeating system, a plurality of repeater motors, differential gearing interconnecting said motors, reversing contacts driven by said means, a reversible translating device in circuit with said contacts, and a receiver operable by said translating device.

15. In a range indicator of the class described, the combination with a sending instrument adapted to be manually rotated at will in either direction, of a transmitter indirectly actuated thereby, a device resistive to sudden speed changes associated with the transmitter, and means for causing said device to follow the movments of the sending instrument.

16. In an electrical indicating system, a sending instrument including a plurality of sets of transmitter contacts, means for causing one of said sets of contacts to transmit impulses asynchronous with respect to those of the other of said sets, a receiving instrument including a plurality of repeater motors each connected to one of said sets of contacts, and a common member actuated by said motors.

17. In an electrical indicator system, a sending instrument including a plurality of trismitters, means connected to all of said transmitters, for causing one to transmit impulses asynchronous with respect to those of the others, a receiving instrument including a plurality of repeater motors actuated from said transmitters, and differential gearing connecting said motors to each other and to the receiver.

18. The combination with a sending instrument, of a receiver comprising a repeater motor, a power motor, an indicator, a two part contact device, one part being connected to the repeater motor, and the other to the indicator, a second two part contact device, one part of which is connected to said repeater motor, and the other part to the power motor, and an additional lost motion connection between said last named part and the indicator.

19. The combination with a sending instrument, of a receiver comprising a repeater motor, a power motor, an indicator, a two part contact device comprising a pair of contact members and coöperating contact therefor, a second similar contact device, one part of each device being connected to the repeater motor and the other to the power motor and means connecting the indicator and power motor.

20. In a range indicating system, a sending instrument including a transmitter, a receiving instrument including a repeater motor connected to said transmitter, a cam member actuated by said receiving instrument and an indicator actuated by said cam, said cam being so designed as to impart a constant movement to said indicator for equal changes of range.

21. In an electrical indicator system, a sending instrument including a plurality of impulse transmitters so connected that each impulse of one of said transmitters occurs at a later time than the corresponding impulse of another of said transmitters, a plurality of step-by-step repeater motors, each adapted to be actuated by one of said transmitters, and a common member actuated by said motors.

22. In an electrical indicator system, a transmitting instrument, a receiving instrument comprising a pair of repeater motors adapted to be actuated alternately by said transmitting instrument, and a common member actuated by said motors.

23. In combination, a movable member of a range finder having variable displacements for uniform changes in range, a member having uniform displacements for uniform changes in range and a mechanical driving mechanism interposed between said members for converting the variable movement of said first named member into a uniform rotary movement.

In testimony whereof, I have signed my name to this specification, this 12th day of November, 1915.

Dr. ELEMER MEITNER.